(12) United States Patent
Forte

(10) Patent No.: US 11,757,288 B1
(45) Date of Patent: *Sep. 12, 2023

(54) SYSTEM FOR POWERING AND CONTROLLING FURNITURE-MOUNTED LIGHT FIXTURES

(71) Applicant: The Wiremold Company, West Hartford, CT (US)

(72) Inventor: James W. Forte, Wallingford, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,890

(22) Filed: Jul. 13, 2022

Related U.S. Application Data

(63) Continuation of application No. 16/587,668, filed on Sep. 30, 2019, now Pat. No. 11,394,207, which is a continuation of application No. 15/269,498, filed on Sep. 19, 2016, now Pat. No. 10,431,990.

(60) Provisional application No. 62/220,353, filed on Sep. 18, 2015.

(51) Int. Cl.
| | |
|---|---|
| *H02J 5/00* | (2016.01) |
| *H01R 25/00* | (2006.01) |
| *H01R 24/28* | (2011.01) |
| *H01R 27/02* | (2006.01) |
| *H01R 107/00* | (2006.01) |
| *H01R 103/00* | (2006.01) |

(52) U.S. Cl.
CPC ............... *H02J 5/00* (2013.01); *H01R 24/28* (2013.01); *H01R 25/006* (2013.01); *H01R 27/02* (2013.01); *H01R 2103/00* (2013.01); *H01R 2107/00* (2013.01)

(58) Field of Classification Search
CPC ......... H02J 5/00; H01R 24/28; H01R 25/006; H01R 27/02; H01R 2103/00; H01R 2107/00

See application file for complete search history.

(56) References Cited

U.S. PATENT DOCUMENTS

| | | | | |
|---|---|---|---|---|
| 4,551,577 A | * | 11/1985 | Byrne ..................... | A47B 21/06 439/131 |
| 5,575,668 A | * | 11/1996 | Timmerman .......... | A47B 21/06 439/131 |
| 7,621,764 B2 | * | 11/2009 | Shunjie ................. | H01R 27/02 439/131 |

(Continued)

*Primary Examiner* — Tho D Ta

(74) *Attorney, Agent, or Firm* — McCormick, Paulding & Huber, PLLC

(57) ABSTRACT

According to the present disclosure, a switching system for a fixture includes a first switch unit with a first switch actuator and a first power cord with an integrally formed power connector at its distal end. The first switch unit has an electrical receptacle configured to receive a corresponding power connector of a cord electrically connected to the fixture. The electrical receptacle is electrically coupled to the first power cord through the first switch actuator to provide switching actuation to the fixture. The switching system may include a second switch unit that includes a second switch actuator and a second power cord with an integrally formed power connector at its distal end. The first and second switch units are connectable to provide a three-way switching electrical connection.

13 Claims, 5 Drawing Sheets

(56) References Cited

U.S. PATENT DOCUMENTS

| | | | | |
|---|---|---|---|---|
| 8,295,036 B2* | 10/2012 | Byrne | ............... | H01R 25/003 |
| | | | | 174/67 |
| 8,951,054 B2* | 2/2015 | Byrne | ............... | H01R 35/04 |
| | | | | 362/127 |
| 9,112,298 B1* | 8/2015 | Hayden | ............... | H02G 3/14 |
| 2013/0169049 A1* | 7/2013 | Lo | ............... | H02J 13/00 |
| | | | | 307/39 |
| 2015/0001937 A1* | 1/2015 | Wang | ............... | H02J 7/0045 |
| | | | | 307/52 |

\* cited by examiner

SYSTEM FOR POWERING AND CONTROLLING FURNITURE-MOUNTED LIGHT FIXTURES

CROSS-REFERENCE TO RELATED APPLICATIONS

This application is a continuation of U.S. application Ser. No. 16/587,668 filed Sep. 30, 2019, which is a continuation of U.S. application Ser. No. 15/269,498 filed Sep. 19, 2016, which claims priority to U.S. Provisional Patent Application No. 62/220,353 filed Sep. 18, 2015, each of which is hereby incorporated by reference herein in its entirety.

TECHNICAL FIELD

The present disclosure relates to light fixtures.

BACKGROUND

Switching and dimming of furniture-mounted light fixtures has been conventionally accomplished using hard-wired connections installed by a licensed electrician. This involves hard-wiring AC power wires to the switch or switch/dimmer unit and running electrical wires between the switch or switch/dimmer unit and the furniture-mounted light fixture(s) behind a wall and, possibly also, through openings in the furniture. In a 3-way-switching set-up in which two control units can control a single light fixture, the two switch or switch/dimmer units must also be connected to each other. These connections are time consuming to make. Additionally, with furniture-mounted lights, the electrician often needs to be called in a second time to wire the furniture, as furniture is one of the last items to be installed in a room. In a hotel with hundreds of rooms containing furniture-mounted light fixtures, this can be a significant cost and burden.

Also, some electrical inspectors will not allow furniture to be hard-wired, which requires the electrician to wire ordinary wall outlets into which the furniture-mounted light fixtures must be plugged. Such light fixtures cannot be easily controlled from a remotely located switch or switch/dimmer unit.

SUMMARY

According to the present disclosure, a switching system for a fixture includes a first switch unit with a first switch actuator and a first power cord with an integrally formed standard power connector at its distal end that can be plugged into an ordinary wall outlet. The first switch unit has an electrical receptacle configured to receive a corresponding power connector of a cord electrically connected to the fixture. The electrical receptacle is electrically coupled to the first power cord through the first switch actuator to provide switching actuation to the fixture.

The switching system may also include a second switch unit that includes a second switch actuator and a second power cord with an integrally formed standard power connector at its distal end that can be plugged into an ordinary wall outlet. The second switch unit is connectable to the first switch unit to provide a three-way switching electrical connection.

These and other objects, features and advantages of the present disclosure will become apparent in light of the detailed description of embodiments thereof, as illustrated in the accompanying drawings.

DETAILED DESCRIPTION

Figure 1:
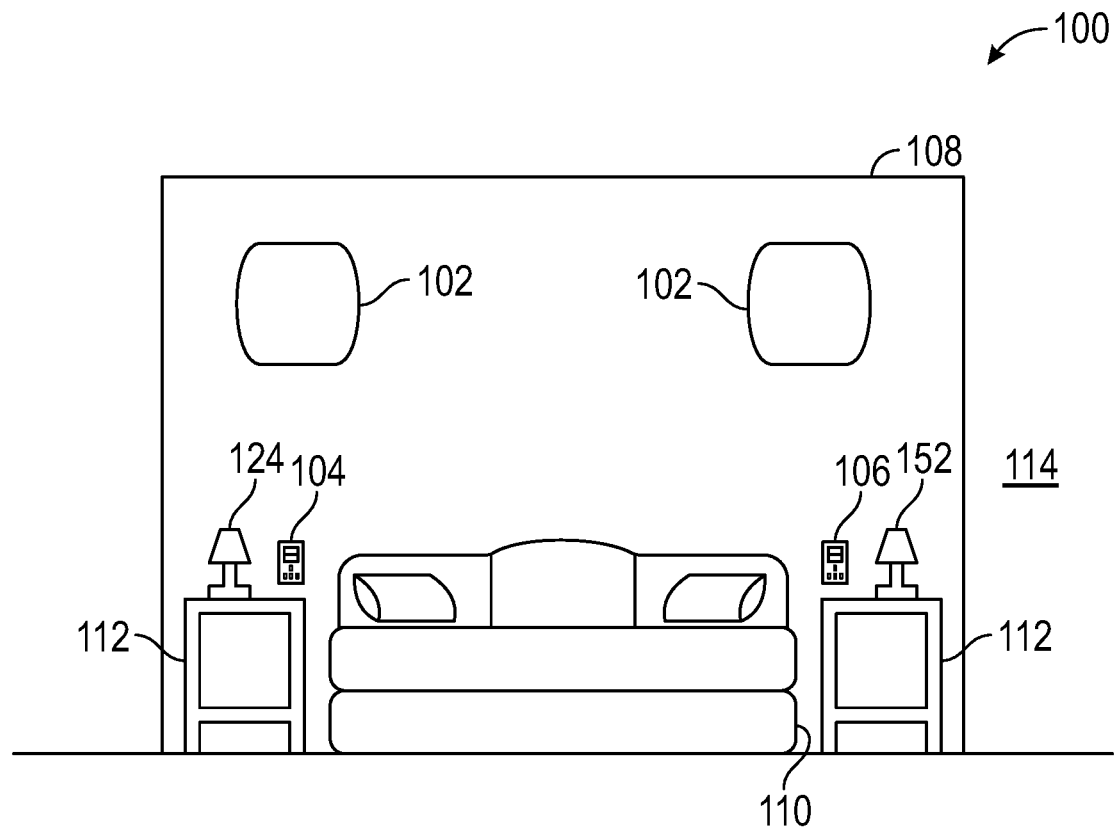
FIG. 1 is an installed front view of a switching system according to the present disclosure.

Before the various embodiments are described in further detail, it is to be understood that the invention is not limited to the particular embodiments described. It will be understood by one of ordinary skill in the art that the systems described herein may be adapted and modified as is appropriate for the application being addressed and that the systems described herein may be employed in other suitable applications, and that such other additions and modifications will not depart from the scope thereof.

In the drawings, like reference numerals refer to like features of the systems of the present application. Accordingly, although certain descriptions may refer only to certain Figures and reference numerals, it should be understood that such descriptions might be equally applicable to like reference numerals in other Figures.

Referring to FIG. 1, a switching system 100 according to the present disclosure is shown for switching and/or dimming a furniture-mounted light fixture 102. The switching system 100 is a 3-way-switching system in which a first switch unit 104 and a second switch unit 106 both control the furniture-mounted light fixture 102. As described below, however, the teachings of the present disclosure may also readily be applied to a one-way switching system in which only a single switch unit, such as the first switch unit 104, controls a particular light fixture, such as the furniture-mounted light fixture 102.

The furniture-mounted light fixture 102 may be mounted to room furniture, such as a headboard 108 of a bed 110, a table 112, a desk, a chest on the side of a bed, or any similar room furnishings. Such furniture is commonly found in, for example, a hotel bedroom 114.

The first switch unit 104 and/or second switch unit 106 may be mounted to the same furniture that light fixture 102 is mounted to, such as headboard 108, or the first switch unit 104 and/or second switch unit 106 may be mounted to different furniture, such as table 112. Preferably, the first and second switch units 104, 106 are mounted near ordinary electrical outlets, for reasons described below.

Figure 2A:
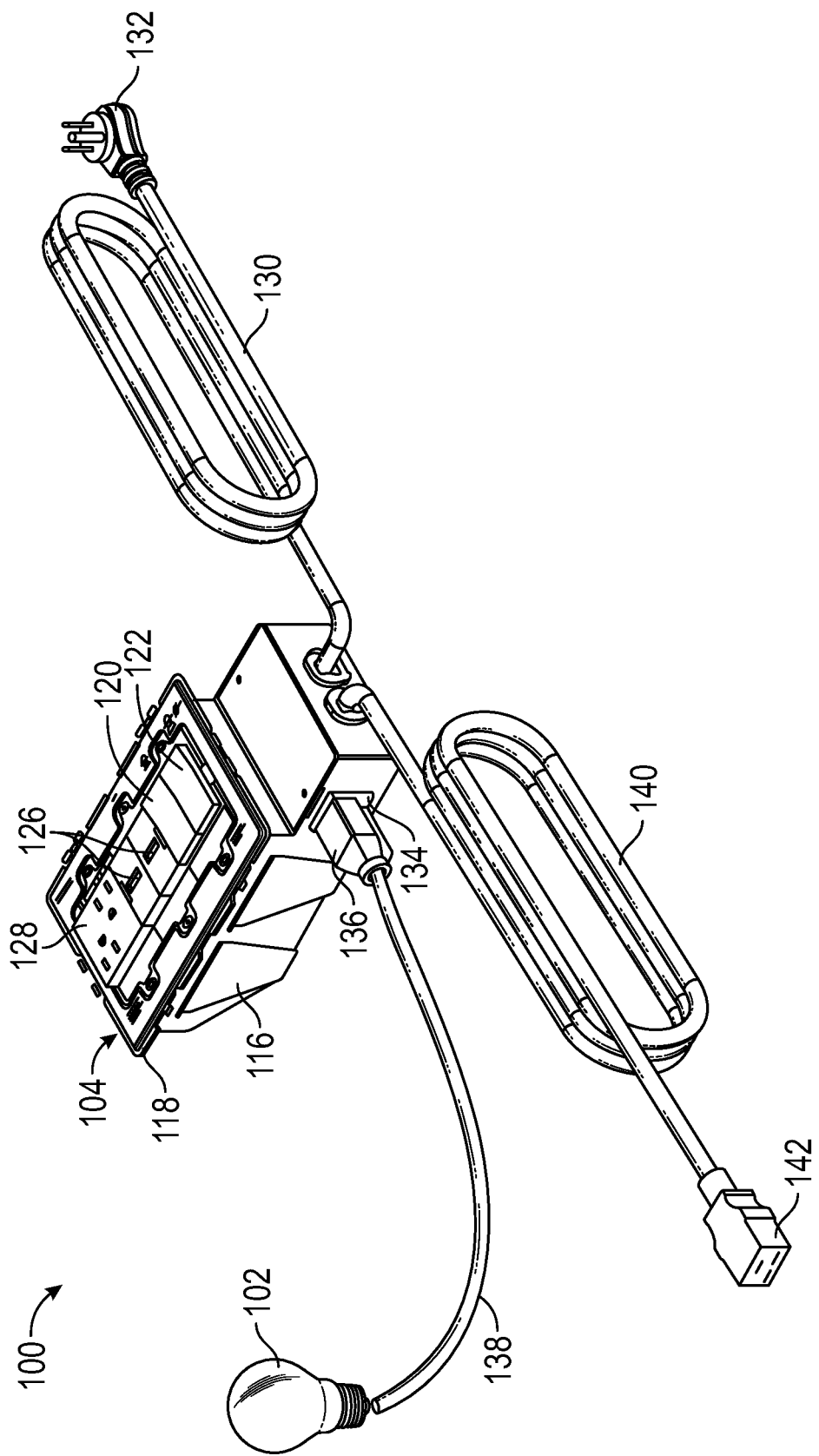
FIG. 2A is a front perspective view of a first switch unit of the system of FIG. 1.

Referring to FIG. 2A, the first switch unit 104 includes a housing 116 defining an interior compartment and a flange portion 118 formed at a top of the housing 116.

The first switch unit 104 is constructed for a 3-way switching application of the light fixture 102 (schematically shown in FIG. 2A) and includes a first switch actuator 120 for turning on and off light fixture 102. The first switch actuator 120 may provide only on/off control of the light fixture 102 or may include a dimmer actuator for providing dimming control of the light fixture 102 in addition to on/off control. The first switch unit 104 may include an additional switch actuator 122 for turning on and off and/or dimming an additional one-way light fixture 124, shown in FIG. 1, that is only controlled by the first switch unit 104 (and not also by the second switch unit 106). The first switch unit 104 may also include one or more USB receptacles 126, such as USB Type-C connectors or the like, for charging and/or powering consumer electronics devices or the like and may include one or more standard electrical receptacles 128 for powering electrical loads.

The first switch unit 104 includes a cord 130 extending outward from the housing 116. The cord 130 has an integrally formed standard male 3-prong power connector 132 at a distal end from the housing 116. The power connector 132 is configured to plug into an ordinary wall outlet to provide electrical power to the first switch unit 104. As such, the first switch unit 104 does not have to be hard-wired to AC power wires running behind a wall of the room 114, shown in FIG. 1. Instead, the first switch unit 104 may be powered by plugging the power connector 132 into an ordinary wall outlet, which, advantageously, is a connection that may be made without a licensed electrician.

The first switch unit 104 includes an electrical receptacle 134 at a side of the housing 116. Receptacle 134 is configured to receive a male power connector 136 integrally formed on the end of a cord 138 that is configured to electrically connect to the light fixture 102 at the opposite end. As such light fixture 102 does not need be hard-wired to a switch unit. Instead, the light fixture 102 may be coupled to the first switch unit 104 by plugging the power connector 136 of cord 138 into the receptacle 134 of the first switch unit 104. Advantageously, a licensed electrician is not required to make this connection.

The first switch unit 104 may also include an additional receptacle, which may be identical to the receptacle 134, for connection to the additional light fixture 124, shown in FIG. 1, in substantially the same manner as the light fixture 102 to power the additional light fixture 124, shown in FIG. 1, through the first switch unit 104 and to control switching on and off (one-way switching) using actuator 122.

The first switch unit 104 also includes a cord 140 extending outwardly from the housing 116 with an integrally formed female connector 142 formed at a distal end thereof. The female connector 142 is configured to connect to the second switch unit 106 as discussed below.

The second switch unit 106 includes a housing 144 defining an interior compartment and a flange portion 146 formed at a top of the housing 144. Like the first switch unit 104, the second switch unit 106 is constructed for a 3-way switching application of the light fixture 102 and includes a first switch actuator 148 for turning on and off light fixture 102. The first switch actuator 148 may provide only on/off control of the light fixture 102 or may include a dimmer actuator for providing dimming control of the light fixture 102 in addition to on/off control. The second switch unit 106 may include an additional switch actuator 150 for turning on and off and/or dimming an additional one-way light fixture 152, shown in FIG. 1, that is only controlled by the second switch unit 106 (and not also by the first switch unit 104). The second switch unit 106 may also include one or more USB receptacles 154, such as USB Type-C connectors or the like, for charging and/or powering consumer electronics devices or the like and may include one or more standard electrical receptacles 156 for powering electrical loads.

The second switch unit 106 includes a cord 158 extending outward from the housing 144. The cord 158 has an integrally formed standard male 3-prong power connector 160 at a distal end from the housing 144. The power connector 160 is configured to plug into an ordinary wall outlet to provide electrical power to the second switch unit 106. As such, the second switch unit 106 does not have to be hard-wired to AC power wires running behind a wall of the room 114, shown in FIG. 1. Instead, the second switch unit 106 may be powered by plugging the power connector 160 into an ordinary wall outlet, which, advantageously, is a connection that may be made without a licensed electrician.

Like the first switch unit 104, the second switch unit 106 may include an additional receptacle, which may be identical to the receptacle 134, for connection to the additional light fixture 152, shown in FIG. 1, in substantially the same manner as the light fixture 102 to power the additional light fixture 152, shown in FIG. 1, through the second switch unit 106 and to control switching on and off (one-way switching) using actuator 150.

The second switch unit 106 also includes a cord 162 extending outwardly from the housing 144 with an integrally formed male connector 164 formed at a distal end thereof. The male connector 164 of the second switch unit 106 is configured to be plugged into the female connector 142 of the first switch unit 104. Advantageously, a licensed electrician is not required to make this connection. When connected, cords 140 and 162 and connectors 142 and 164 provide the electrical connection between the first switch unit 104 and the second switch unit 106 that is required for three-way switching. Connectors 142 and 164 may advantageously be non-standard electrical connectors to prevent a user from plugging an electrical load into connector 142 or from plugging in male connector 164 into an ordinary wall outlet. Connectors 142 and 164 are also preferably different in their construction from receptacle 134 and connector 136 to prevent improper electrical connections.

The receptacle 134 may advantageously be constructed to receive a non-standard male power connector, i.e., a connector that cannot plug into an ordinary wall outlet. Thus, if either of the switch units 104 or 106 includes a dimming actuator for light fixture 102, the receptacle 134 physically prevents a user from plugging into the receptacle 134 an electrical device that receive power through an ordinary male power connector and that does not accommodate dimmable lighting loads. The reason for this is that when a receptacle is electrically connected to a dimmer, loads other than dimmable lighting loads may not operate properly when plugged into the receptacle. Alternatively, the receptacle 134 may be a standard outlet, such as a standard NEMA 5-15R outlet, but may be provided with a warning that only lighting loads should be connected to the outlet so that an installer or user is warned that electrical devices that are not compatible with dimmers should not be plugged into the outlet. Additionally, if neither of the first switch unit 104 or the second switch unit 106 includes a dimming actuator for the light fixture 102, the receptacle 134 may be constructed to receive a standard male power connector. In other words, receptacle 134 may be a standard NEMA 5-15R receptacle.

Figure 3:
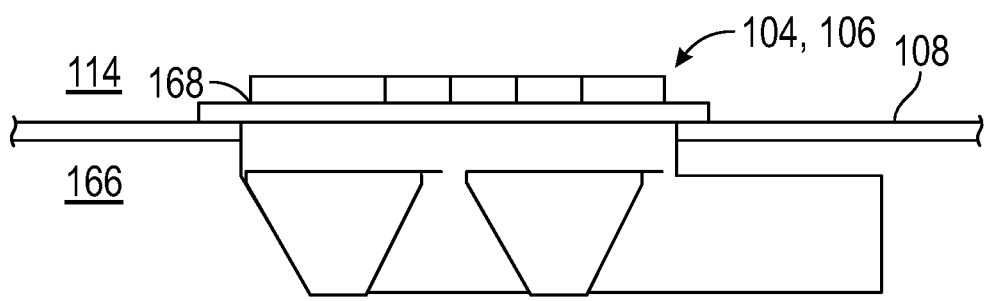
FIG. 3 is a side view of a switching unit of the system of FIG. 1.

Referring to FIG. 3, the first and second switch units 104, 106 are mounted to the furniture, such as headboard 108, with the flange portion 118, 146 resting on a surface of the furniture exposed to the room 114 and with the housing 116, 144 on an unexposed side 166 of the furniture. Thus, each flange portion 118, 146 defines a control surface 168 of the first and second switch units 104, 106 exposed to the room 114 and on which the first switch actuators 120, 148, additional switch actuators 122, 150, USB receptacles 126, 154 and/or standard electrical receptacles 128, 156 are positioned, while the housing 116, 144 is accommodated on the unexposed side 166 of the furniture.

Referring back to FIGS. 2A and 2B, in operation, the light fixture 102 is connected to the first switch unit 104 at the receptacle 134, the first switch unit 104 and second switch unit 106 are connected to one another by the connectors 142 and 164 and the first switch unit 104 and second switch unit 106 are each plugged into an ordinary wall outlet by plug connectors 132 and 160, respectively. These plug-and-play connections may all advantageously be made without requiring a licensed electrician. This enables three-way switching and/or dimming control of the light fixture 102 through the first switch actuator 120 of the first switch unit 104 and the first switch actuator 148 of the second switch unit 106.

Figure 2B:
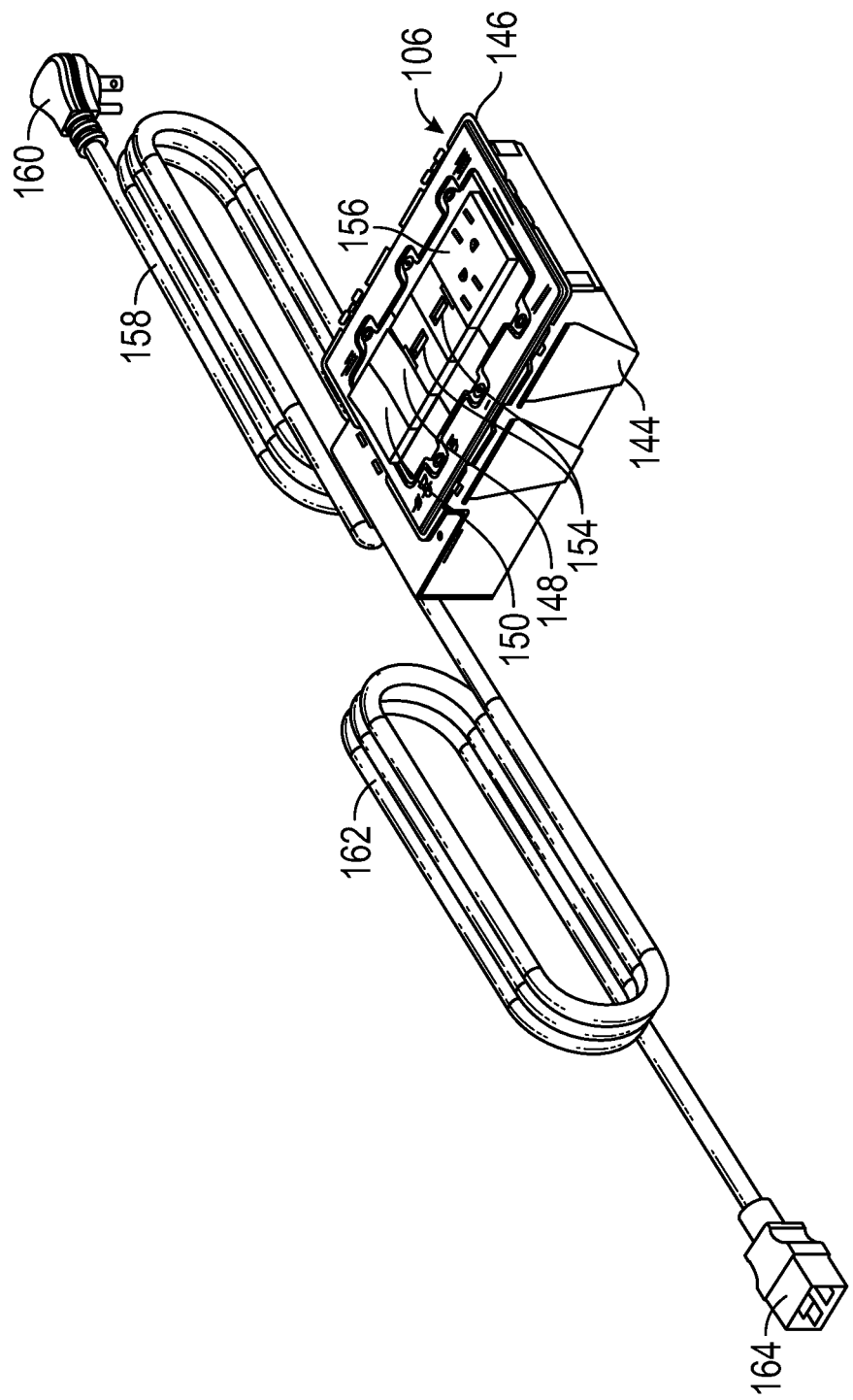
FIG. 2B is a front perspective view of a second switch unit of the system of FIG. 1.
Figure 4:
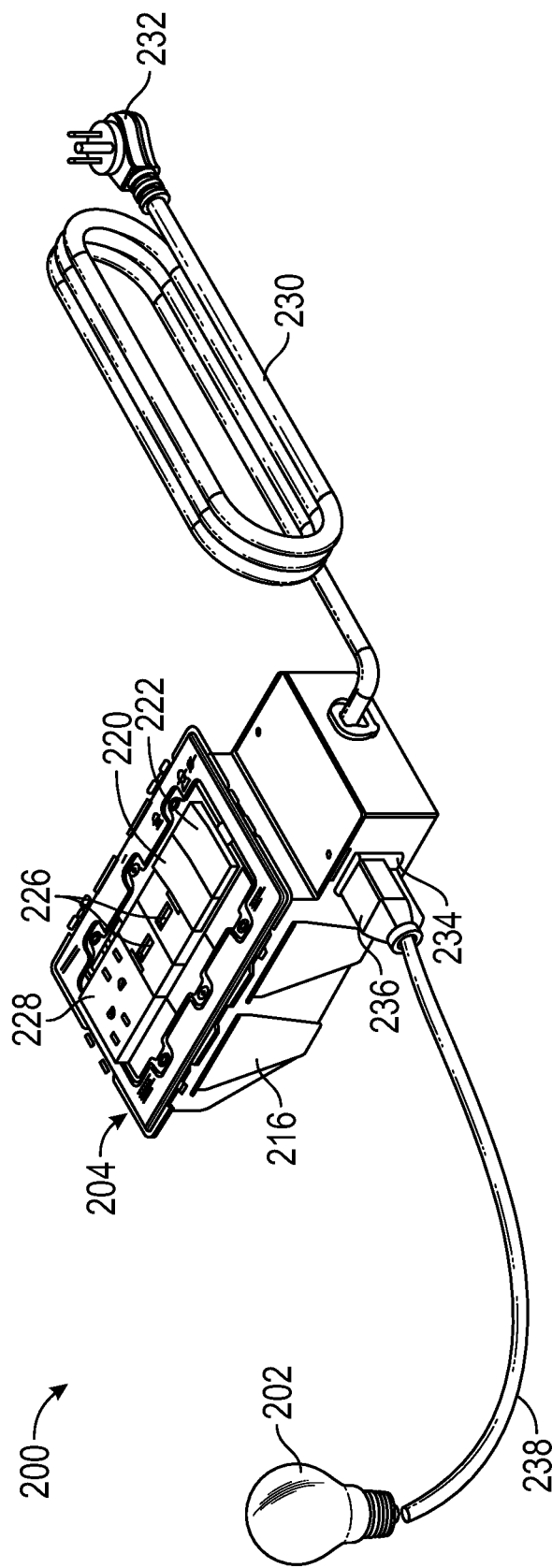
FIG. 4 is a front perspective view of a switching system according to the present disclosure.

While the system 100 shown in FIGS. 2A and 2B is a three-way switching system, the plug-and-play teachings of the present disclosure may also be implemented in a one-way system 200 as shown in FIG. 4. In the one-way system 200, a light-fixture 202 is plugged into and controlled by a single switch unit 204 (or switch/dimmer unit) that is similar to the first switch unit 104 discussed above. The single switch unit 204 differs from the first switch unit 104 in ways that would be readily apparent to a person of ordinary skill in the art by omitting the cord like cord 140 for connection to the second switch unit 106 and by including internal circuitry for a one-way switching application as opposed to a three-way switching application.

The single switch unit 204 includes a first switch actuator 220 for turning on and off light fixture 202. The first switch actuator 220 may provide only on/off control of the light fixture 202 or may include a dimmer actuator for providing dimming control of the light fixture 202 in addition to on/off control. The single switch unit 204 may include an additional switch actuator 222 for turning on and off and/or dimming an additional one-way light fixture in the same manner discussed above. The single switch unit 204 may also include one or more USB receptacles 226 for charging and/or powering consumer electronics devices or the like and may include one or more standard electrical receptacles 228 for powering electrical loads.

The single switch unit 204 includes a cord 230 extending outward from housing 216. The cord 230 has an integrally formed standard male 3-prong power connector 232 at a distal end from the housing 216. The power connector 232 is configured to plug into an ordinary wall outlet to provide electrical power to the single switch unit 204. As such, like the first and second switch units 104 and 106, shown in FIGS. 2A and 2B, the single switch unit 204 does not have to be hard-wired to AC power wires running behind a wall of the room 114, shown in FIG. 1. Instead, the single switch unit 204 may be powered by plugging the power connector 232 into an ordinary wall outlet, which, advantageously, is a connection that may be made without a licensed electrician.

The single switch unit 204 includes an electrical receptacle 234 at a side of the housing 216. Receptacle 234 is configured to receive a male power connector 236 integrally formed on the end of a cord 238 that is configured to electrically connect to the light fixture 202 at the opposite end. As such light fixture 202 does not need be hard-wired to a switch unit. Instead, the light fixture 202 may be coupled to the single switch unit 204 by plugging the power connector 236 of cord 238 into the receptacle 234 of the single switch unit 204. Advantageously, a licensed electrician is not required to make this connection.

In operation, the single switch unit 204 is mounted to the furniture in the same manner discussed above in connection with the first and second switch units 104 and 106, the light fixture 202 is connected to the single switch unit 204 at the receptacle 234, and the single switch unit 204 is plugged into an ordinary wall outlet by plug connector 232. These plug-and-play connections may advantageously be made without requiring a licensed electrician. This enables one-way switching and/or dimming control of the light fixture 202 through the first switch actuator 220 of the single switch unit 204.

While various embodiments have been described, it will be appreciated by those of ordinary skill in the art that modifications can be made to the various embodiments without departing from the spirit and scope of the invention as a whole. Accordingly, the particular embodiments described in this specification are to be taken as merely illustrative and not limiting.

What is claimed is:

1. A switching system for a fixture, the switching system comprising:
   a first switch unit comprising:
      a first housing including a wall defining an interior compartment;
      a first switch actuator actuatable from an exterior of the first housing;
      a first power cord extending outward from the first housing, the first power cord having an integrally formed standard power connector at its distal end;
      an electrical receptacle formed in the first housing and configured to receive a corresponding power connector of a cord electrically connected to the fixture; and
      a first connection cord extending outward from the first housing, the first connection cord having one of a corresponding male or female connector integrally formed at its distal end;
   a second switch unit comprising:
      a second housing;
      a second switch actuator actuatable from an exterior of the second housing;
      a second connection cord extending outward from the second housing, the second connection cord having the other of the corresponding male or female connector integrally formed at its distal end;
   wherein the corresponding male and female connectors are connectable to provide a three-way switching electrical connection between the first switch unit and the second switch unit.

2. The switching system according to claim 1, wherein the first switch actuator comprises a dimming actuator.

3. The switching system according to claim 1, wherein the first switch unit additionally comprises at least one USB receptacle electrically coupled to the first power cord within the first housing.

4. The switching system according to claim 1, wherein the first switch unit additionally comprises at least one standard electrical receptacle electrically coupled to the first power cord within the first housing.

5. The switching system according to claim 1, wherein the first switch unit additionally comprises an additional switch actuator actuatable from the exterior of the first housing; and
   an additional electrical receptacle formed in the first housing and configured to receive a corresponding power connector of a cord electrically connected to an additional fixture;
   wherein the additional electrical receptacle is electrically coupled to the first power cord within the housing through the additional switch actuator.

6. The switching system according to claim 1, wherein the electrical receptacle is electrically coupled to the first power cord within the housing through the first switch actuator to provide one-way switching.

7. A switching system for a furniture-mounted light fixture, the switching system comprising:
a first switch unit comprising:
a first housing including a wall defining an interior compartment and a flange portion defining a control surface;
a switch actuator positioned at the control surface and actuatable from an exterior of the housing;
a power cord extending outward from the interior compartment through the wall, the power cord having an integrally formed standard power connector at its distal end;
an electrical receptacle formed in the wall of the first housing and configured to receive a corresponding power connector of a cord electrically connected to the furniture-mounted light fixture; and
a first connection cord extending outward from the first housing, the first connection cord having one of a corresponding male or female connector integrally formed at its distal end;
a second switch unit comprising:
a second housing;
a second switch actuator actuatable from an exterior of the second housing; and
a second connection cord extending outward from the second housing, the second connection cord having the other of the corresponding male or female connector integrally formed at its distal end;
wherein the corresponding male and female connectors are connectable to provide a three-way switching electrical connection between the first switch unit and the second switch unit.

8. The switching system according to claim 7, wherein the furniture-mounted light fixture is mounted to the furniture.

9. The switching system according to claim 7, wherein the furniture is a first furniture, and wherein the furniture-mounted light fixture is mounted to a second furniture.

10. The switching system according to claim 1, further comprising a flange portion, wherein the first switch unit is configured to be mounted to a furniture such that, when mounted, the flange portion rests on a surface on an exposed side of the furniture and the first housing is arranged on an unexposed side of the furniture.

11. The switching system according to claim 1, wherein the three-way switching electrical connection enables three-way switching of the fixture.

12. The switching system according to claim 7, wherein the first switch unit is configured to be mounted to a furniture such that, when mounted, the flange portion rests on a surface on an exposed side of the furniture and the first housing is arranged on an unexposed side of the furniture.

13. The switching system according to claim 7, wherein the three-way switching electrical connection enables three-way switching of the furniture-mounted light fixture.

\* \* \* \* \*